May 4, 1965    M. T. WORST    3,181,633
REGISTERING SCALE SYSTEM
Filed Sept. 23, 1960
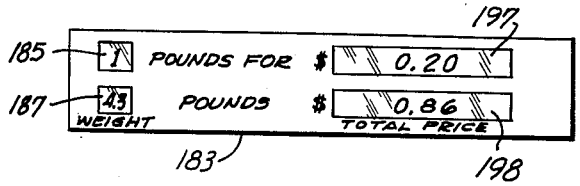
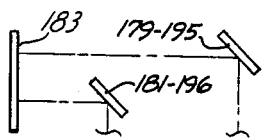
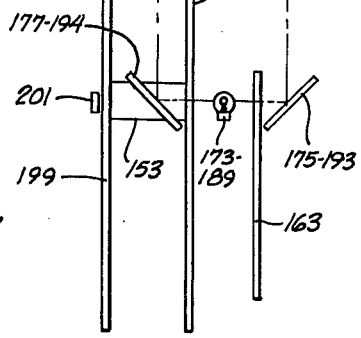
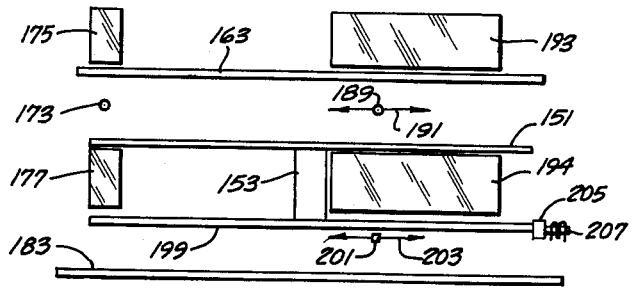
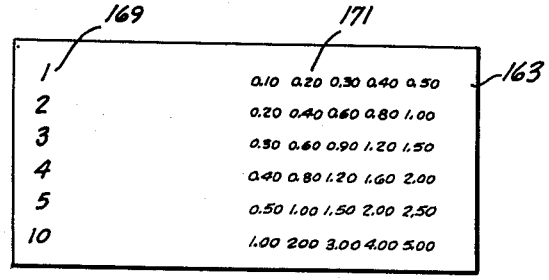
MARC T. WORST
INVENTOR.
BY
ATTORNEYS

United States Patent Office 3,181,633
Patented May 4, 1965

3,181,633
REGISTERING SCALE SYSTEM
Marc T. Worst, 110 Russell Ave., Portola Valley, Calif.
Filed Sept. 23, 1960, Ser. No. 58,007
1 Claim. (Cl. 177—44)

This invention relates to weighing scales and more particularly to those weighing scales and systems wherein the weight amount together with other pertinent information is displayed and registered.

In supermarket transactions, many of the products are sold and purchased on a price by the pound basis. In the usual course of events, the purchaser selects a quantity of the desired product, which may, for example, be produce, and delivers the package to a check-out counter. At the check-out counter, the clerk weighs the package on a price computing scale and manually registers the amount and price of the total package in the register. In such operations, two figures are presented to the customer; first, the weight of the package as shown on the scale, and second, the price of the package as shown on the register. Although the customer is ordinarily well aware of the price per pound, it is usually a difficult mental calculation to determine if the clerk has registered the proper total.

Moreover, in the use of such computing scales having a large array of figures on their faces, the possibility of an accidental mistake is quite evident.

Use of the present invention eliminates to a great extent the possibility of error and especially of human error. The invention relates to a system for automatically pricing the produce or goods as they are weighed. The automatically determined price is not only displayed to the view of the customer but is also automatically registered in the cash register itself. The display to the customer not only includes the actual weight of the produce, but the price per pound(s) and the total price of the produce or goods.

Such an addition to scale and register systems not only provides the customer with an accurate determination of weight and price but is also an aid to the scale and register user. The clerk must merely insert the pricing rate into the system and is not concerned with the actual weight or total cost; these latter two figures being handled automatically.

It is, therefore, a general object of this invention to provide an automatic weighing and registering system.

It is a more particular object of this invention to provide a weighing system wherein the goods to be priced by weight are placed on a scale and merely the price per pound(s) is entered in by the clerk; with the total price being registered automatically.

It is another object of this invention to provide a weighing system which includes an automatic display of the weight of the produce, price per pound(s), and total price.

These and other objects and features of the invention will become more clearly apparent upon reading of the following description in conjunction with the accompanying drawings in which:

FIGURE 1 is a front elevational view, in schematic form, of an embodiment of the invention;

FIGURE 2 is a side elevational view of the embodiment shown in FIGURE 1;

FIGURE 3 is a top plan view of the embodiment shown in FIGURE 1;

FIGURE 4 is an elevational view of a pricing plate used in accordance with the embodiment shown in FIGURE 1;

FIGURE 5 is a front view of the screen of FIGURE 2.

An embodiment of the invention is shown in FIGURES 1 through 5. In each of the figures similar elements are identified by identical reference numerals. A weight and total price disc 151 is shown connected to the shaft 153 for rotation therewith. The rotation of the shaft 153 may be caused by any element of an associated weighing scale having motion directly proportional to the weight thereon.

As noted particularly in FIGURE 1, the disc 151 is divided into a weight portion 155 and a total price portion 157. The disc may be of a transparent material such as glass or plastic and have imprinted thereon indicia 159 for the weight and 161 for total prices.

A pricing plate 163 is disposed behind the disc 151 and includes a rack portion 165 at one edge thereof for cooperation with the gear 167. Rotation of the gear 167 causes vertical movement of the plate 163. The plate 163 like the disc 151 may be constructed of a transparent material and have imprinted thereon indicia 169 for the pricing weight and 171 for the price as shown particularly in FIGURE 4.

As seen more clearly in FIGURES 2 and 3, a stationary point source of light 173 is disposed between the disc 151 and the plate 163. The location of the source 173 is directly behind the weight portion 155 of the disc 151 and in front of the pricing weight portion 169 of the plate 163. Mirrors 175 and 177 are disposed directly opposite the light source 173 on the opposite sides of the plate 163 and disc 151 respectively.

As seen in FIGURE 2, mirrors 179 and 181 are disposed directly above the mirrors 175 and 177, respectively. The light source 173 cooperates with the disc 151 and plate 163 and the mirrors to reflect images onto a ground glass screen 183. As seen in FIGURE 2 pricing weight indicia 169 (FIGURE 4) from the plate 163 is reflected to an area 185 on the screen 183 (FIGURES 2 and 5) and weight indicia 159 is reflected to the area 187 on the screen 183. The mirrors employed may be such as to reflect a magnified image from the disc 151 and plate 163. It is obvious that the use of such a mirror system will involve image reversals and the numerals on various discs may be reversed to accommodate the same. However, in the drawings the numerals are shown in normal order for the sake of clarity.

In addition, a second point light source 189 is shown disposed between the plate 163 and disc 151. The source 189 unlike the source 173 is movable in the direction shown by the arrows 191. Mirrors 193 to 196 cooperate with the light source 189 in the manner similar to the mirrors 175, 177, 179 and 181 with respect to the light source 173. Mirrors 193 to 196, however, have an extended length to accommodate the light source throughout its horizontal movement.

A second disc 199 may be connected to the shaft 153 for rotation along with the disc 151. Total prices are imprinted upon the disc 199 similar to the disc 151. However the prices on the disc 199 rather than being normal numerical indicia may be in the form of coded information. Thus a code such as binary code for the various total prices may be placed in each location of the disc 199 corresponding to the location for a similar total price in numerical indicia on disc 151. The disc 199 may comprise a printed circuit type board whereby one side of the disc is entirely coated with conductive material and the opposite side coated with small points of conductive metal having connections to the disc through the fully conductive side. Thus, the code information pickup 201 which moves in a horizontal direction as shown by the arrows 203 in synchronism with the light source 189 may be utilized to pick up the coded information and apply the same to a register. Other forms of information storage and pick up may be used in lieu of the printed disc 199 and pickup 201. Such other forms may include magnetic, optical or character recognition type informative determination.

In the operation, the plate 163 is raised or lowered by rotation of the gear 167 until the proper pricing weight appears in the window 185. This indication will occur when the proper pricing weight indicia 169 appears directly opposite the light source 173.

The light source 189 is then travelled in the horizontal direction until the proper price per pound(s) appears in the window 197. This likewise appears when the light source 189 is directly opposite the proper indicia 171 on the plate 163.

The produce to be weighed may be placed on the scale either before or after the pricing information is set into the machine. The disc 157 is rotated by the weight until the proper weight indicia 159 appears in the window 187. Simultaneously therewith, the total price will appear in the window 198.

The prices are arranged for the disc 151 such that the total prices for the lower pricing rates are located near the center of the disc. As the pricing rate increases, the total prices are located closer to the periphery. Thus, the accuracy of the total price reading is increased as the pricing rate and overall accuracy is accomplished. In the particular embodiment shown, it is seen that each cent of the monetary system is represented for each pricing rate without unnecessary crowding at the high rates or unnecessary spaces at the lower rates as is evident with parallel or cylindrical pricing scales.

As a variation of the above described embodiment, the transparent disc 151 and/or plate 163 may be replaced by the mirror surfaced disc and plate, respectively. The mirror surfaced plate and disc may be accommodated with non-reflective indicia. The light source may then be used to impinge on the mirrored surfaces and reflect the area surrounding the indicia to a mirror closely adjacent to the light source and upward onto the mirrors 179 and 181, 195, 196 and onto the screen 183 where the indicia will appear as a non-illuminated outline with an illuminated background. If 151 is a mirror disc, the function of disc 199 can be performed on its reverse side and 199 eliminated. In such an embodiment, the mirror should be as closely adjacent to the light sources 173 and 189 as possible to provide the minimum angle of incidence with respect to the reflected image from the disc and plate. It is apparent that, alternatively, the indicia may be reflective with the background being non-reflective. Similarly, in the embodiment employing transmission, either the indicia or background may be transparent with the other opaque.

If such a mirrored disc is utilized rather than a transparent disc, the reverse side of the mirrored disc itself may be such as a surface for the coded information. With such an arrangement, the second disc 199 would not be necessary.

Thus, it is seen that a new scale system has been provided. The system is capable of converting the weight of certain goods into digital information which may be used to activate a cash register. Moreover, the system is capable of directly displaying not only the total price but also the price per pound(s) and the number of pounds.

I claim:

A scale system comprising a scale, a rotatable disc cooperating with said scale and having a rotation proportional to weight of objects placed on the scale, said disc including indicia thereon indicative of said weight, means for reading said weight indicia, said disc also including indicia indicative of total price information arranged in concentric circles about said disc, each of said circles corresponding to the total prices of various weights at a particular unit price, manually operable means for entering pricing information comprising a plate disposed adjacent said disc, said plate including a first column of indicia thereon indicative of pricing weight and additional columns of indicia thereon indicative of price, a stationary light source disposed between said plate and said disc in registry with the indicia on said disc indicative of said weight and also in registry with said first column of indicia on said plate, means for moving said plate longitudinally of said columns, a movable light source disposed between said plate and said disc and in registry with the indicia on said disc indicative of total price and also in registry with said additional columns on said plate, said movable light source being movable across said concentric circles of indicia on the disc and across said additional columns of indicia on said plate, and means for developing a visible image of said weight, total price, pricing weight and price information from said light source and individual elements of said indicia.

References Cited by the Examiner
UNITED STATES PATENTS

| | | | |
|---|---|---|---|
| 1,176,959 | 3/16 | Greenup | 235—58 |
| 1,205,564 | 11/16 | Priddy | 177—40 |
| 1,830,050 | 11/31 | Carroll | 235—58 |
| 2,163,183 | 6/39 | Baagoe | 177—2 |
| 2,376,234 | 5/45 | De Castro | 235—58 |
| 2,723,113 | 11/55 | Meeker | 177—36 |
| 2,948,464 | 8/60 | Allen | 235—58 |
| 3,064,743 | 11/62 | Marshall et al. | 235—58 |

LEO SMILOW, *Primary Examiner.*
A. BERLIN, LEYLAND M. MARTIN, *Examiners.*